June 19, 1962 J. A. WHITING ET AL 3,039,218

PHONOGRAPH RECORD

Filed Jan. 13, 1961

James A. Whiting
Jimmie O. Rogers
INVENTORS

BY Clarence A. O'Brien
and Harvey B. Jacobson
Attorneys

United States Patent Office 3,039,218
Patented June 19, 1962

3,039,218
PHONOGRAPH RECORD
James A. Whiting and Jimmie O. Rogers, both of
P.O. Box 1224, Mobile, Ala.
Filed Jan. 13, 1961, Ser. No. 82,604
1 Claim. (Cl. 40—340)

This invention relates to new and useful improvements in phonograph records, and the principal object of the invention is to provide a novel arrangement whereby a center portion of the record is removable and carries indicia to identify an artist associated with a particular recording on the sound track of the record. For example, if the recording is that of a song, the indicia on the removable center portion of the record may be a picture of the singer, or if the recording is that of an orchestral piece, the indicia may be the name and/or picture of the orchestra. In any event, the arrangement is such that the removable center portion, when removed, provides a circular opening at the center of the record for reception of a phonograph turntable shaft so that the record may be used in the customary manner, while the removed center portion may be effectively utilized as a "charm" or an ornament, either by itself or in conjunction with others, on a bracelet, necklace, or the like. In this manner, the wearer of such a charm or ornament may display to others his or her particular preference in recorded music as portrayed by the indicia on the ornament, with the benefit of such display being derived from the record itself. From the foregoing it is self-evident that the use of the invention is particularly intended for "teen-age" record enthusiasts, although it will be understood that the invention is by no means limited to this environment and that the removable center portion of the record with the indicia thereon may also be used for many other purposes.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Figure 1:
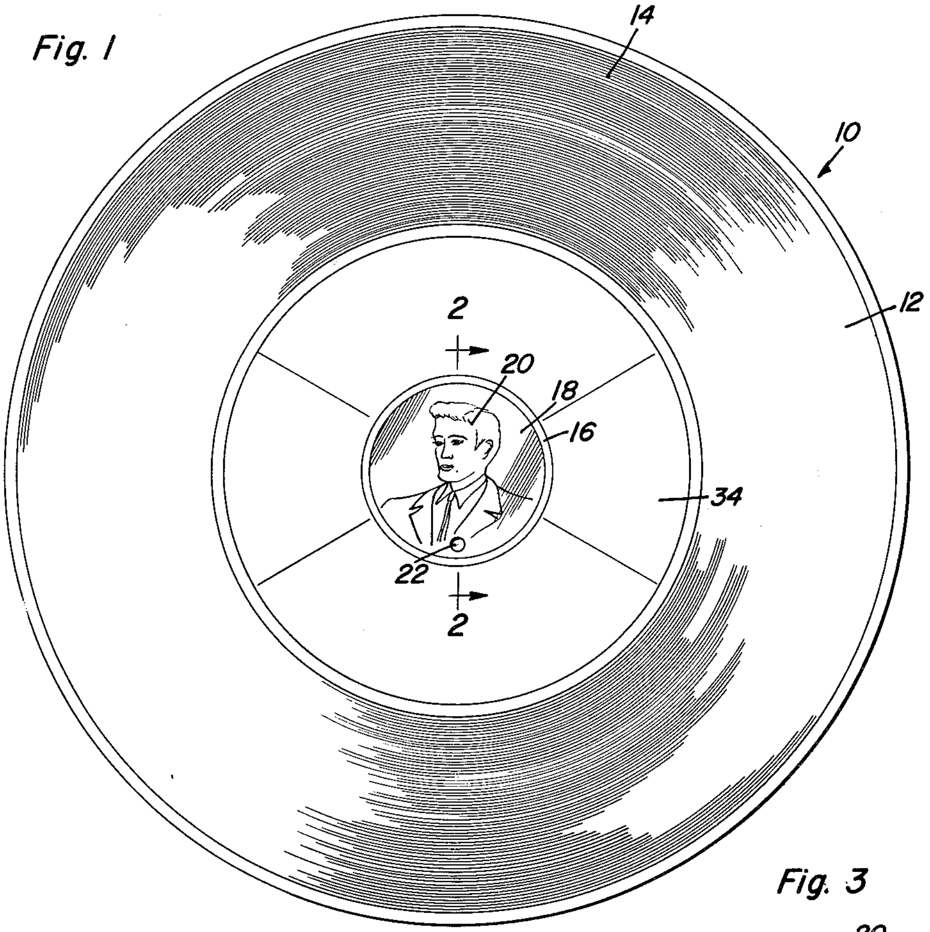
FIGURE 1 is a plan view of a phonograph record in accordance with the invention.
Figure 3:
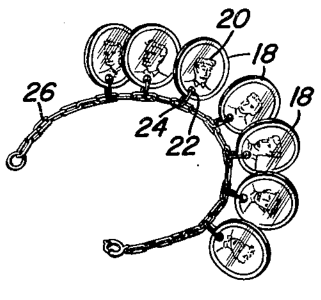
FIGURE 3 is a perspective view showing several of the removable record portions embodied into a bracelet.
Figures 2, 4, 5:
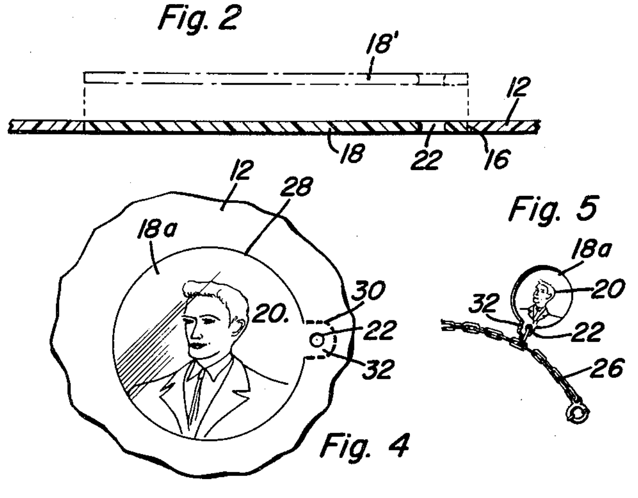
FIGURE 2 is an enlarged sectional view, taken substantially in the plane of the line 2—2 in FIGURE 1.
FIGURE 4 is a fragmentary plan view, showing a modified form of the invention.
FIGURE 5 is a fragmentary perspective view of a bracelet utilizing the form of the invention shown in FIGURE 4.

Referring now to the accompanying drawings in detail, more particularly to FIGURES 1–3, the general reference numeral 10 designates a phonograph record having a main body portion 12 provided with a sound track 14 and formed adjacent the center thereof with an endless, circular line of weakness 16 defining a center portion 18. The line of weakness 16 is rupturable by finger pressure on the center portion 18, whereby the center portion may be readily removed from the main body portion 12 of the record or disc, it being apparent that when the center portion is so removed, it provides a circular opening at the center of the record to accommodate the usual turntable shaft of a phonograph, so that the record may be played in the usual manner.

The center portion 18, removed from the record is indicated by the dotted lines 18' in FIGURE 2, and it is to be understood that the record disc to which the invention is especially adapted is of the so-called 45 r.p.m. variety for use on phonographs having a relatively thick turntable shaft, whereby the removable center portion 18 is of sufficient diameter and area to carry indicia 20, such as for example, a picture of an artist associated with the recording on the sound track 14.

The removable center portion 18 is provided with an eccentrically disposed aperture 22 and when the center portion is removed from the record, a suitable flexible fastening element 24 may be passed through this aperture for securing the portion 18 to the links of a chain bracelet 26, necklace, or the like, as shown in FIGURE 3. Several of the portion 18, removed from several records, may thus be used as "charms" or ornaments, whereby their wearer may display to others his or her preferences in recorded music. Manifestly, the portions 18 may also be used individually, rather than in a group as shown.

The modified embodiment of the invention shown in FIGURES 4 and 5 is substantially the same as the embodiment already described, with exception that the line of weakness 28 herein extends only nearly around a full circle, the full circle being completed by a U-shaped line of weakness 30 which defines a projecting tab 32 on the center portion 18*a*. While the line of weakness 30 is integral with the record disc and rupturable, the line of weakness 28 completely separates the center portion 18*a* from the main body portion of the record, so that the center portion is held in place only by the tab 32. As such, the center portion may be readily removed together with the tab 32 by application of finger pressure thereto, and the fully separated line of weakness 28 assures that the opening left in the record upon removal of the center portion has smooth edges which do not interfere with free sliding of the record along the turntable shaft. The aperture 22 in this instance is provided in the tab 32 and the apertured tab thus conveniently serves in attaching the removed center portion to the bracelet 26, necklace, ankle chain, or the like, as the case may be.

It may be noted that in any event, the main body portion 12 of the record is provided with an annular label 34 surrounding the removable center portion, which label serves to identify the recording on the disc even after the center portion is removed.

The foregoing is considered as illustrative only of the principles of the invention. Further, since numerous modifications and changes will readily occur to those skilled in the art, it is not desired to limit the invention to this disclosure and all suitable modifications and equivalents may be resorted to, falling within the scope of the invention as claimed.

What is claimed as new is:

A phonograph record comprising a disc having a main body portion with a sound track thereon and provided adjacent the center thereof with an endless line of weakness defining a removable center portion which, when removed, provides a circular opening at the center of the disc for reception of a turntable shaft, and indicia carried by said removable center portion, said indicia identifying an artist associated with a recording on said sound track, said removable center portion being provided with an eccentrically disposed aperture.

References Cited in the file of this patent

UNITED STATES PATENTS

| | | |
|---|---|---|
| 1,282,011 | Aylsworth | Oct. 15, 1918 |
| 2,283,797 | Dech | May 19, 1942 |
| 2,734,738 | Parvin | Feb. 14, 1956 |

FOREIGN PATENTS

| | | |
|---|---|---|
| 928,161 | France | May 26, 1947 |
| 967,028 | France | Mar. 15, 1950 |
| 1,239,726 | France | Nov. 3, 1959 |